United States Patent [19]

Courrege

[11] E Patent Number: Re. 33,136

[45] Reissued Date of Patent: Dec. 26, 1989

[54] BURNER FOR GAS BLOW TORCH

[75] Inventor: Claude Courrege, La Haillan, France

[73] Assignee: Rippes S.A., France

[21] Appl. No.: 171,108

[22] Filed: Mar. 7, 1988

Related U.S. Patent Documents

Reissue of:

[64] Patent No.: 4,631,023
Issued: Dec. 23, 1986
Appl. No.: 813,760
Filed: Dec. 27, 1985

U.S. Applications:

[63] Continuation-in-part of Ser. No. 345,749, Feb. 4, 1982, abandoned, which is a continuation of Ser. No. 40,953, May 21, 1979, abandoned.

[30] Foreign Application Priority Data

May 29, 1978 [FR] France ..... 78 16497

[51] Int. Cl.[4] ..... F23D 14/14

[52] U.S. Cl. ..... 431/329; 431/346; 431/354

[58] Field of Search ..... 431/158, 329, 346, 350, 431/353, 354, 355; 239/590.3, 590.5

[56] References Cited

U.S. PATENT DOCUMENTS

| | | | |
|---|---|---|---|
| 554,253 | 2/1896 | Finlay | 431/346 |
| 1,354,295 | 9/1920 | Hamilton | 431/346 |
| 1,368,120 | 2/1921 | Cole | 431/346 |
| 2,985,233 | 5/1963 | Stellmach | 431/355 |
| 3,035,632 | 5/1962 | Ericsson | 431/346 |
| 3,360,029 | 12/1963 | Thompson | 432/83 |
| 3,617,161 | 11/1971 | Polidoro | 431/350 |
| 3,759,245 | 9/1973 | Greco | 126/406 |
| 3,852,025 | 12/1974 | Placek | 431/329 |

FOREIGN PATENT DOCUMENTS

| | | | |
|---|---|---|---|
| 755649 | 10/1969 | Belgium . | |
| 733718 | 7/1932 | France . | |
| 1566100 | 5/1969 | France . | |
| 157719 | 6/1969 | France | 431/329 |

*Primary Examiner*—Randall L. Green
*Attorney, Agent, or Firm*—William A. Drucker

[57] ABSTRACT

A gas burner for burning a high velocity gas to produce an external flame having a homogeneous front portion and using gas injecting means having a nozzle connected to a source of inflammable gas under pressure and an air passage adapted to create through a tube a flow of air and inflammable gas at high speed which is injected in an adaptation chamber connected to the tube and provided with an internal curved diffusion grill and two external deflectors, the diffusion grill being positioned so that the walls of the adaptation chamber are maintained at the temperature of the environment during combustion of the gas.

12 Claims, 3 Drawing Sheets

BURNER FOR GAS BLOW TORCH

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of U.S. Ser. No. 345,749 filed Feb. 4, 1982, now abandoned, which, in turn, is a continuation of U.S. Ser. No. 040,953 filed May 21, 1979, now abandoned.

BACKGROUND OF THE INVENTION

The invention relates to a burner adapted to be used in conjunction with a blow torch fed at a high gas flow rate.

SUMMARY OF THE INVENTION

It is an object of the invention to provide a burner for use in blow torches and the like capable of operating effectively at high gas flow rates while providing a flame which adheres to the burner.

It is another object of the present invention to provide a burner for the low temperature heating of films composed of a plastic material by means of the gas flow generated by the combustion of a combustible gas such as propane and air.

It is still another object of the present invention to provide a burner that maintains its side walls at room temperature during the combustion of the mixture of gases burned by the burner.

It is still another object of the present invention to provide a burner having an external flame in the shape of a flat brush which is substantially rectilinear and has a homogeneous temperature.

These and other objects of the invention are achieved by means of a burner for burning a high velocity gas to produce a flame. The burner comprises an enclosure for enclosing the gas. This enclosure comprises an outlet and a diffusion grill. The diffusion grill has a generally omega-shaped vertical cross section. Furthermore, the diffusion grill is positioned with respect to the outlet such that the outlet and the diffusion grill together comprise means for positioning at least a portion of flame outside of the outlet, thereby producing external combustion of gas in open air.

In one embodiment, the enclosure further comprises an outer wall. In this embodiment, the burner comprises means for maintaining the outer wall at substantially the temperature of the environment in which the burner is used during combustion of the gas.

In addition, the diffusion grill can further comprise a front section and two side sections. Both the front section the two side sections comprise a plurality openings therein, and the two side sections are spaced inwardly from the outer wall to form lateral flow passages for the gas between the side sections and the outer wall.

The burner can further comprise means for injecting the gas into the enclosure. The injecting means injects the gas at a sufficient velocity into the enclosure that the injecting means, the enclosure, the diffusion grill and the outlet together comprise means for producing a flame positioned at the exterior of the outlet. Also, the enclosure can further comprise an inlet and the burner can further comprise means for injecting the gas under pressure at a predetermined velocity into the inlet.

The injecting means can comprise a nozzle connected to the inlet and communicating with a source of gas under pressure. Further, the injecting means or the enclosure can further comprise at least one opening therein. The opening is positioned along the length of the enclosure at substantially the same position along the length of the enclosure at which the nozzle is connected to the enclosure. The at least one opening comprises means for permitting the passage of air therethrough to the enclosure so that this air mixes with the gas injected into the enclosure. Also, the injecting means can inject the gas into the enclosure such that the velocity of the gas-air mixture in the enclosure adjacent to the inlet is substantially equal to 12,660 meters per minute.

In still another embodiment, the enclosure further comprises a tube and an adaptation chamber. The tube receives the high velocity gas under pressure and the adaptation chamber houses the diffusion grill.

The adaptation chamber can comprise front and rear portions. One end of the tube receives the high velocity gas under pressure and the other end of the tube is attached to the rear portion of the first section of the adaptation chamber. Also, the first section of the adaptation chamber has a larger cross sectional area than the tube. Furthermore, the first section of the adaptation chamber comprises a top and a bottom wall and two lateral walls. The top and bottom walls converge vertically towards each other and diverge laterally from the rear portion to the front portion of the top and bottom walls.

The lateral walls can diverge outwardly from the rear portion to the front portion of the lateral walls, and the lateral walls can have a decreasing height from the rear portion to the front portion of the lateral walls. As a result, the cross-sectional area of the first section increases from the rear portion to the front portion of the first section.

In addition, the second section of the adaptation chamber houses the diffusion grill therein. The second section is parallelipipedic in shape and further comprises top and bottom parallel rectangular walls comprising front and rear edges. The rear edges of the top and bottom walls of the second section are attached to the front portion of the top and bottom walls of the first section. Furthermore, the lateral walls of the second section are rectangular and parallel and have front and rear edges. The rear edges of the lateral walls are attached to the front portion of the lateral walls of the first section.

The diffusion grill can comprise a perforated metal element at least a portion of which is hemi-cylindrically shaped. Further, the central portion of the diffusion grill can extend substantially perpendicular to the longitudinal axis of the enclosure and the adaptation chamber, while the two lateral portions of the diffusion grill can extend substantially parallel to the top and bottom walls of the second section. Also the diffusion grill can be generally concave in shape and can curve inwardly toward the interior of the adaptation chamber.

The adaptation chamber further comprises two deflectors each extending frontwardly and inwardly from the front edge of a different one of the top and bottom walls of the second section of the adaptation chamber. Furthermore, the two deflectors comprises two spaced apart front edges which comprise the outlet of the enclosure. In addition, the two deflectors can form a substantially 45° angle with the wall to which each deflector is attached. Also, the front edges of the deflectors can be parallel to one another and spaced from one another by a distance less than the height of the lateral walls of the second section. In addition, the deflectors extend forwardly substantially less than the top and bottom walls of the second section. Also, the deflectors can be rectangular in shape.

In a preferred embodiment, the outer wall that comprises the enclosure can be imperforate.

In still another embodiment, the outlet has a predetermined width and the diffusion grill can comprise a forwardmost portion. This forwardmost portion is positioned from said outlet a distance less than the width of said outlet. Also, the enclosure can further comprise an inlet and a wall comprising a tapered portion. In this embodiment the burner further comprises a means for burning the gas and producing a flame positioned adjacent to the burner.

In one embodiment, the cross-section of the grill can comprise two parallel lines and the tapering portion of the outer wall can comprise two converging flaps. In still another embodiment, the cross-section of the grill can be circular and the tapering portion of the outer wall can be conical.

In still another embodiment, the openings of the diffusion grill have a total surface area of at least equal to or greater than the surface area of an outlet opening of the gas burner. In still another embodiment, the diffusion grill can comprise a single layer of perforated sheet metal or alternately the diffusion grill can comprise inner and outer layers of perforated sheet metal. In this latter embodiment the openings of the outer layer of sheet metal have a greater surface area than the openings of the inner layer of sheet metal so as to prevent flames from backing up behind the diffusion grill. Also, in this embodiment the inner and outer layers of perforated sheet metal are superimposed to one another and contact one another along their front portions. Furthermore, the front portions of the inner and outer layers can be offset from one another along their front portions.

In still another embodiment, the outer wall can comprise at least one groove and the diffusion grill can further comprise a flange arranged at the base of the side sections so that the flange is fitted within the groove. Furthermore, the spacing of the side sections from the outer wall can be a function of the length of the flange and the depth of the groove.

In still another embodiment, the diffusion grill comprises the front portion and two side walls. In this embodiment, the front portion of the diffusion grill and the side walls can both extend in the same plane. In still another embodiment, the diffusion grill comprises a front portion comprising two planar portions arranged at an angle to one another. Also, the burner can be formed out of two half shells arranged so as to form the inlet and to maintain the diffusion grill therebetween.

In still another embodiment the enclosure and the diffusion grill together comprise means for producing an exterior flame of substantially homogeneous temperature. Furthermore, the enclosure and the diffusion grill can also together comprise means for producing an exterior flame having a substantially rectilinear-shaped front portion. Also, the enclosure and the diffusion grill can together comprise means for producing a gas flow at the outlet having a substantially identical speed across the outlet.

As noted above the adaptation chamber comprises converging or tapered walls which comprise the outlet. The flame that is produced begins substantially at the point at which the tapered walls are connected to the rest of the adaptation chamber, which can be called the body of the adaptation chamber. The flame then extends through and beyond the outlet.

In still another embodiment the invention relates to a gas burner for burning a high velocity gas in a blow torch. The burner is adapted to be used in an environment. The gas burner comprises means for enclosing the gas which, in turn, comprises an outlet, an outer wall, and a diffusion grill. The diffusion grill has a generally omega-shaped cross-section, and is positioned with respect to the outlet such that the outlet and the diffusion grill together with said burner comprise means for maintaining the outer wall at substantially the temperature of the environment during combustion of the gas when the outer wall is substantially at the temperature of the environment before burning the gas.

In still another embodiment, the invention relates to a gas burner for burning a combustible gas to produce a flame. The burner comprises means for enclosing the gas. The enclosing means comprises an outlet. In addition, the burner further comprises a diffusion grill positioned sufficiently close to the outlet so that at least a portion of the flame extends beyond the outlet outside the burner, and means for producing a substantially rectilinearly shaped flame outside the outlet having a substantially homogeneous temperature. In this embodiment the diffusion grill has a generally omega-shaped vertical cross-section and the means for producing the substantially rectilinear-shaped flame and homogeneous temperature comprises two tapered outer walls comprising the outlet of the burner.

The term "omega shaped cross-section" when used throughout this description to define the vertical cross-section of the grill is taken to mean the shape described by the letter omega as well as shapes closely approximating this shape. Thus, as will be shown with respect to the drawing, the omega shape may vary from the rounded embodiment shown in FIG. 3 to the more angular embodiments shown in FIGS. 4 and 5. FIGS. 4 and 5 illustrate a grill having flattened front portions 6. The phrase further includes front sections arranged in the same plane as the side section as shown in FIG. 5.

In addition, the term "forward direction" or "forwardly" refers to the direction in which the gas travels from injector 102 to the outlet at extensions 117 and 118 as seen in FIG. 6. The term "rearward direction" or "rearwardly" refers to the opposite direction from the forward direction.

The horizontal cross-section of the grill may be either parallelipeptic, i.e. comprises two parallel lines, or circular; other shapes also being possible. The shape of the grill as well as the shape of the tapering outer wall of the burner are matched so as to provide the desired lateral flow passages contemplated by the invention. Thus, when operating with tapering outer walls having a circular cross section the grill used will also have a horizontal circular cross-section. When the tapering outer walls are parallelipipedic, as shown in FIG. 1 for example, the grill will be coextensive with the outlet of the burner and thus also have a parallelipeptic horizontal cross-section.

In a preferred embodiment of the invention, the openings of the diffusion grill have a total surface area which is at least equal to or greater than the surface area of the outlet of the gas burner.

The diffusion grill itself may comprise either a single or double layer of perforated sheets of metal; other suitable grill materials also being possible. The number of layers used will depend on the flow rate and pressure of the gas being used. When using a plurality of diffusion grills, the grills may be directly and completely superimposed upon one another or they may be offset at the location of their front sections. Furthermore, when using a plurality of diffusion grills each being provided with openings or orifices, the outer layer of metal or like material forming the outer diffusion grill preferably has openings whose total surface area is greater than the openings of the inner diffusion grill whereby the flame is prevented from backing up into an expansion chamber behind the diffusion grill.

In another embodiment, the base of the diffusion grill is provided with an outwardly extending flange adapted to be received in a groove provided along the surface of the wall of the burner. The spacing of the side section of the diffusion grill from the tapering wall of the burner will thus be a function of the length of the flange as well as the depth of the groove.

BRIEF DESCRIPTION OF DRAWINGS

The characteristics and advantages of the invention may be seen clearly with reference to the attached drawings, given by way of example only in which.

DETAILED DESCRIPTION OF PREFERRED EMBODIMENTS

To accomplish the purpose of low temperature heating of films made of plastic material the burner of the present invention is adapted to produce a gas flow having a temperature between approximately 120° and 540° C. at a predetermined distance from the burner and the flame. For example, the present invention which will be described in detail below produces that following temperatures at the following distances from the outlet of the burner (point OO in FIG. 6) along the longitudinal axis of symmetry of the burner:

| Distance from the outlet of the burner (in cm) | Temperature (in Celsius) |
|---|---|
| 30 | 450 |
| 40 | 350 |
| 50 | 295 |
| 60 | 265 |
| 70 | 230 |
| 80 | 145 |

Thus, in order to heat a plastic film at a temperature of 450° C., the plastic film to be heated is positioned at 30 cm from the burner outlet. More generally, if the plastic film is positioned between 30 cm and 80 cm from the outlet of the burner, the film will experience a temperature of between 145° C. and 450° C., depending upon the distance chosen. Because the temperature of the flame at the outlet of the burner of the present invention is homogeneous, the present invention produces a stream of warm air at the various distances from the burner noted above that is homogeneous in temperature and which is substantially free of any combusting matter. As a result, the present invention prevents any burning, reddening, or swelling of the film to be heated. Furthermore, the flame that is produced will have the shape of a substantially flat brush, and will be spaced from the walls of burner, thereby not heating up the walls of the burner.

Figure 6:
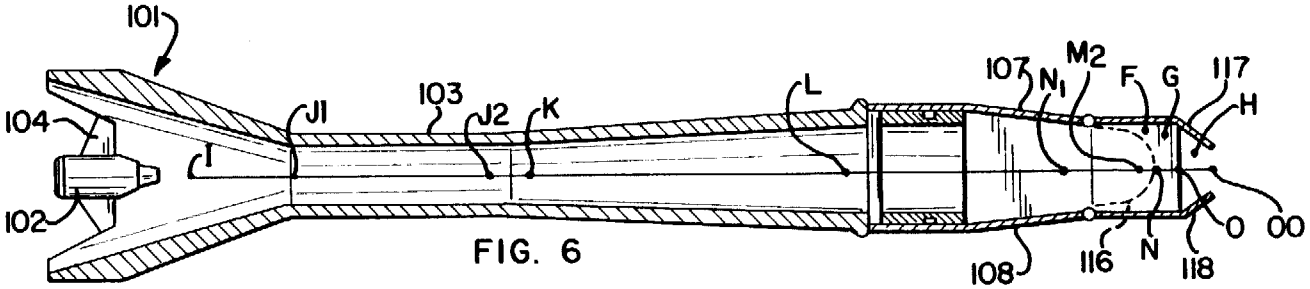
FIG. 6 illustrates a schematic side view of the entire apparatus.

The apparatus which produces these results comprises as is seen in FIG. 6 an injector 101, a tube 103, an adaptation chamber 105, and two deflectors 117 and 118. These elements enclose gas to be burned as will be discussed below. Further, it should be noted that FIG. 6 is a one-half scale illustration of the burner of the present invention in which one centimeter of the burner in FIG. 6 corresponds to two centimeters of the burner in actuality. Thus, for example, the distance from the apex of grill 116 (point N) to the end of the burner (point OO) is approximately 0.9 cm in FIG. 6 which corresponds to 1.8 cm in actuality. In addition, the distance from point N to point O, the point at which the deflectors begin is approximately 0.4 cm in FIG. 6 and 0.8 cm in actuality.

Injector 101 is a conventional injector and comprises a nozzle 102 connected to a source of flammable gas at a pressure of approximately 3–4 bars. Nozzle 102 is attached to an inlet at the rear of tube 103. Also provided in either nozzle 102 or tube 103 is at least one opening 104 for the passage of air into tube 103 to mix with the flammable gas passing from nozzle 102 into tube 103. This at least one opening 104 can be located above or below nozzle 102 at approximately the same point along the length of tube 103 that nozzle 102 is located. In one embodiment there is just one opening 104, and in an alternate embodiment there are a plurality of openings 104.

Nozzle 102 in combination with the at least one opening 104 and tube 103 together act as a jet pump which moves air in a forward direction from the at least one air passage 104 and creates at entrance point I of tube 103 as seen in FIG. 6, a flow of a combination of air and flammable gas at a high speed of approximately 12,660 meters per minute.

Figure 7:
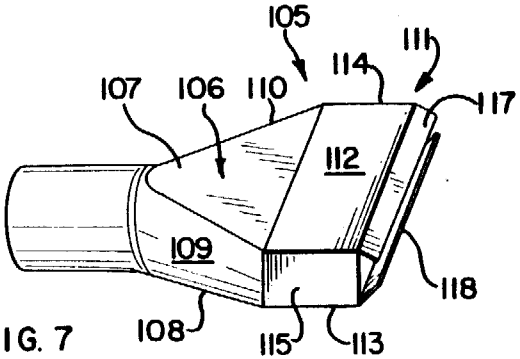
FIG. 7 illustrates a perspective view of the recuperation chamber of the present invention.

The front of tube 103 is attached to the rear point of and adaptation chamber 105. Adaptation chamber 105 comprises a first section 106, the rear of which is connected to the front of tube 103, and a second section 111. First section 106 is called an enlarged section because it has a cross-sectional area substantially greater than the cross-sectional area of tube 103. First section 106 comprises top and bottom walls 107 and 108, as seen in FIGS. 6 and 7 which converge slightly inwardly towards each other in the vertical direction and diverge laterally. Furthermore, top and bottom walls 107 and 108 increase in width from the rear to the front thereof. First section 106 also includes two laterally diverging walls 109 and 110 which laterally diverge from the rear to the front thereof. These lateral walls 109 and 110 also have a slightly decreasing height from the rear to the front of these sections. As a result, the cross-sectional area of the first section 106 increases in size from its rear portion which is attached to tube 103 to its front portion which is attached to second section 111 of the adaptation chamber 105.

Second section 111 of adaptation chamber 105 comprises a tubular portion which is parallelipipedic in shape, having two substantially parallel top and bottom walls or surfaces 112 and 113 which are relatively large in area and extend frontwardly from the front of top and bottom walls 107 and 108. Second section 111 also includes two parallel, rectangular lateral walls or surfaces 114 and 115 which extend frontwardly from the front edges of lateral walls 109 and 110.

An omega-shaped diffusion grill 116 is positioned in section section 111 as seen in FIG. 6. Diffusion grill 116, which will be discussed in more detail below, comprises a perforated metal element that is generally hemi-cylindrical in shape. A central portion of diffusion grill 116 extends substantially perpendicular to the longitudinal axis of tube 103 and chamber 105 and the two lateral portions of diffusion grill 116 extend substantially parallel to walls 112 and 113. As a result, grill 116 forms a curved element in the interior of section 111 which is generally concave, and which curves inwardly toward the interior of recuperation chamber 105. The central portion of grill 116 is positioned in the general vicinity of an opening or outlet in the forward end of adaptation chamber 105.

The front end of adaptation chamber 105 is attached to two deflectors 117 and 118 which extend forwardly therefrom. Deflectors 117,118 form an angle of approximately 45° with walls 112,113, respectively. These two deflectors extend forwardly a substantially shorter distance than the distance that top walls 112 and 113 extend in the forward direction. Furthermore, these two deflectors comprise two spaced apart parallel front edges which form between them the outlet for the burner of the present invention. The distance between the front edges of the two deflectors is smaller than the height of lateral sides 114 and 115. For example, this distance between the front edges of the deflectors can be 1.6 cm. In addition, the distance from the forwardmost point N of grill 116 to the outlet (point O) is preferably less that the width of the outlet (i.e. the distance between the the front edges of the deflectors).

The operation of the burner of the present invention will now be discussed.

Flammable gas under pressure is fed from a source of pressurized flammable gas through nozzle 102 into tube 103. At the same time, air from outside of tube 103 is drawn through openings 104 into tube 103 so as to mix with the flammable gas under a pressure of 3–4 bars entering tube 103 through nozzle 102. This air mixes with the combustible gas and travels forwardly through tube 103. At point I in the immediate vicinity adjacent nozzle 102 the velocity of this mixture of air and combustible gases is approximately 12,660 meters per minute.

Figure 8:
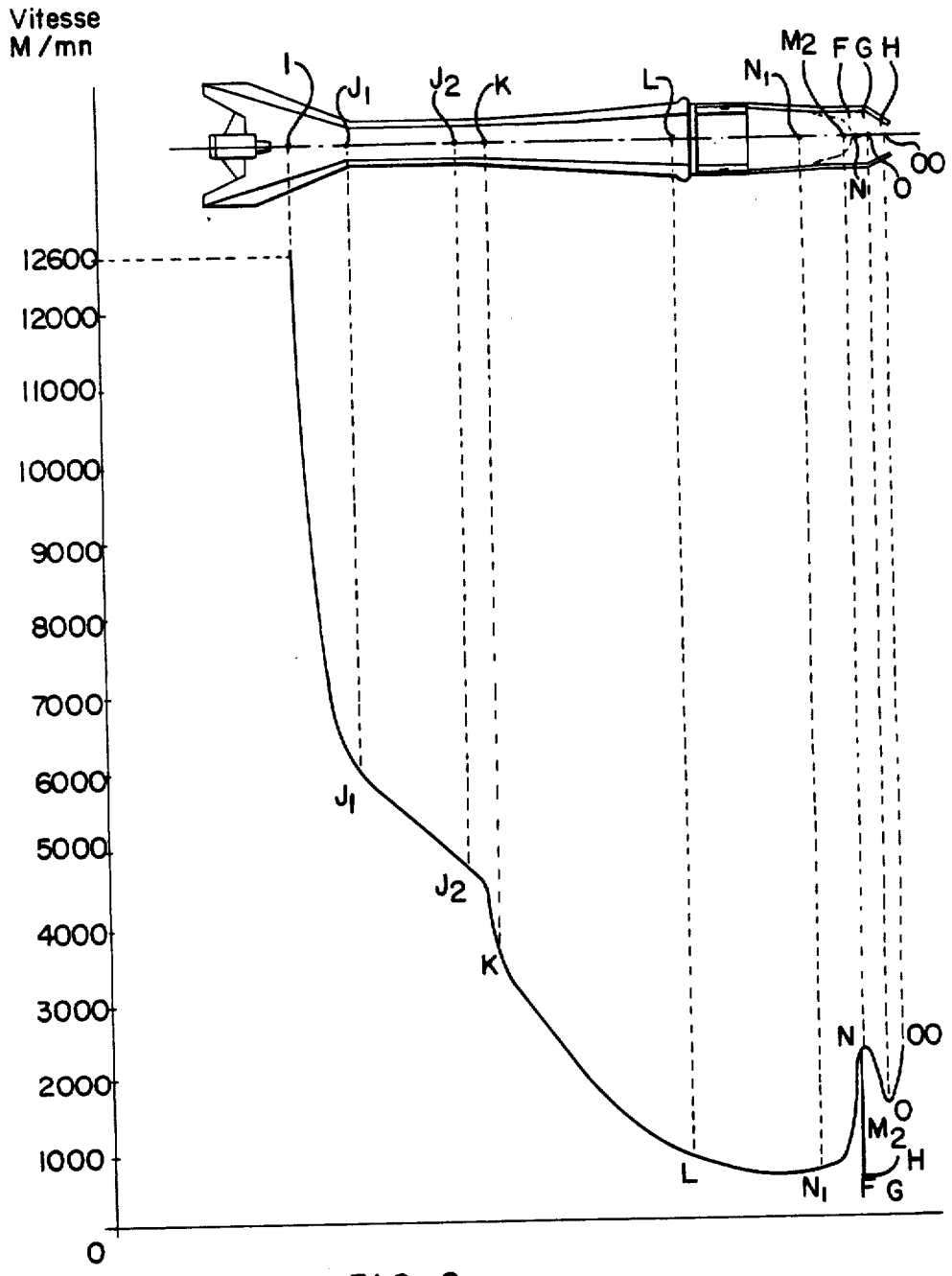
FIG. 8 illustrates a graph of the speed of the gas passing through the apparatus at different points in the burner.

As the gas travels forwardly through tube 103 this mixture of air and combustible gas decreases in velocity, as can be seen in the graph reproduced in FIG. 8. For example, at point J the velocity of the gases is 6,000 meters per minute, at point $J_1$ the velocity of the gases is approximately 6,000 meters per minute, at point $J_2$ the velocity of gases is approximately 4,600 meters per minute, at point K the velocity is approximately 3,500 meters per minute, and at point L the velocity is approximately 1,000 meters per minute.

In adaptation chamber 105 the speed of the gases experiences a slight decrease as can also be seen in the graph in FIG. 8 as the gas travels from point L to point $N_1$. Furthermore, in a downstream portion of chamber 105 as the gas passes through diffusion grill 116 the combination of gases develops a fan-like configuration.

In addition, between walls 112, 113 a relatively homogeneous pressure zone is formed adjacent to the inner face of the grill 116.

As the gases pass through the performations in grill 116 the combustible mixture of gases forms a series of jets which are again accelerated as can be seen from the graph in FIG. 8 which indicates that the speed of the gases has increased to 2,400–2,500 meters per minute at point N in front of grill 116. This series of jets extends through the entire section 111 to the outside of recuperation chamber 105. In the central portion of grill 116 these jets are oriented substantially axially, that is substantially along the longitudinal axis of tube 103, and recuperation chamber 105. In contrast, at the side or lateral portions of grill 116 (which extend substantially parallel to faces 112 and 113) the jets are oriented substantially radially and contact walls 112 and 113 and deflectors 117 and 118.

The speed of the flow of the mixture of gases formed by these jets radiating from the central portion of grill 116 undergoes a decrease of speed $\Delta V_1$ between point N and point O. This can be seen by reviewing the graph in FIG. 8 in which at point O the speed of the gases is approximately 1600 meters per minute. This decrease in speed results in part from an expansion of the combination of gases which occurs as the gases exit from the central perforations of grill 116. This expansion of the gases is facilitated by the distribution of the gas into jets radiating from the different perforations in grill 116. Furthermore, this decrease in speed of the flow of gases permits combustion to occur at a slight distance from grill 116.

Combustion of the mixture of gases begins at point O, and extends forwardly of point OO and beyond point OO outside the burner. As can be seen from the graph in FIG. 8 the gases accelerate slightly in front of point O resulting from the expansion of the gases due to combustion. Nevertheless, the speed of the gases at point OO, approximately 2250 m/min, at the outlet of the burner remains less than that measured at point N.

Moreover, the gases flowing from the perforations in the lateral portions of grill 116 undergo a decrease of speed $\Delta V_2$ which is much greater than the decrease in speed $\Delta V_1$. This is because the gas flow passing through the openings in the lateral portion of grill 116 contacts the walls of section 111 and/or 112 and are restrained and slowed by this contact. In addition, this gas flow through the perforations in the lateral portion of grill 116 creates two pressure zones one along wall 107 and deflector 117, and another along wall 108 and deflector 118. These two pressure zones are at a greater pressure than the gas flowing through the central portion of grill 116. Further, in these two zones, the gas undergoes only a weak acceleration, as can be seen by noting that in the graph in FIG. 8 the velocity of the gas at points F, G and H (measured at points near the lateral walls of adaptation chamber 105) is respectfully 600, 650 and 800 meters per minute. As a result, the lateral passageways form dead spaces into which the flame does not spread between grill 116 and walls 107, 108, 112, and 113. Furthermore, deflectors 117 and 118 are also not contacted by the flame but rather, these elements along with the other walls of the adaptation chamber are ventilated by the flow of the combustible mixture of gases. As a result, elements 106, 111, 117, and 118 are not heated but are thermally isolated from the flame and are continuously cold during combustion (i.e., the temperature of the environment in which the burner is used). Consequently, the outer walls of burner do not undergo any increase in temperature during combustion. The burner of the present invention, therefore is said to comprise a "cold nozzle."

As has been discussed above, upon leaving diffusion grill 116 the speed of the gas flow is not homogeneous. In principle, this should lead to a heterogeneity in the temperature of the flame which would be disadvantageous. This disadvantage is eliminated by the use of deflectors 117 and 118 which serve to change the course and velocity of the gas in the two pressure zones on opposite sides of the adaptation chamber originating in the lateral passageways between the lateral portions of grill 116 and walls 112, and 113. Deflectors 117 and 118 cause the gas in thse two zones to converge slightly towards the central region of the gas flow. As a result, the speed of the gas in these two zones is substantially restored to the speed of the gas flowing through the central part of the grill by the time the gases reach point OO.

When the gases are ignited a flame is formed which begins approximately at point O. From this point the flame widens slightly and contracts when the flame passes between the lower edges of the two deflectors. Beyond the deflectors the flame is in the shape of a substantially flat brush which slightly diverges with respect to a plane perpendicular to the plane of FIG. 6. Due to the shape of deflectors 117 and 118 the front of the flame is substantially rectilinear. Further, the temperature of the flame will also be substantially homogeneous and the heated combustion gases in front of the flame naturally mix with the surrounding air to form a flow of warm air which spreads in the axial direction with respect to the longitudinal axis of the burner to substantially evenly heat the plastic material.

The burner described above has a number of characteristics and advantages. First, the burner comprises a cold nozzle burner with outer walls that can be touched by the user without danger. This results from the flame not contacting any of the inner walls of the burner so that the walls of the burner do not undergo significant heating during combustion. Thus, no additional mechanism is necessary to prevent the user from burning himself or herself when using the burner. Second, the burner externally burns the gases in the open air. Third, the burner reduces the risk of overheating the objects to be heated and reduces the risk of "hot spots" on the object to be heated because the flame that is produced has a substantially homogeneous temperature, the gas that flows from the flame at a predetermined distance has a substantially homogeneous temperature and the flame has a front portion which is substantially rectilinear and homogeneous in shape, despite a large heating surface. As a result, the objects to be heated will not deteriorate when heated by the burner.

In summary, the burner of the present invention produces a mixture of gases at a great speed which are injected by injector 102 into tube 103. The combustible mixture then expands in an adaptation chamber having a cross-sectional area larger than tube 103. The gas flow is then divided by grill 116 into a plurality of axial and radial jets. The axial jets form a flat brush of combustible gases traveling at a great speed. The plurality of radial jets causes a decrease in pressure along the lateral sides of the adaptation chamber and deflectors so as to prevent the flame from contacting the walls of the burner. The gas flowing adjacent to the walls of the adaptation chamber is then partially deflected by the deflectors so as to homogenize the velocity and temperature of gases flowing out from the burner. Finally, the combustible gas mixture is burned in the open air at the outlet of the burner.

The diffusion grill will now be discussed in more detail.

The burner comprises two symmetrical half shells attached to one another so as to form an inlet and outlet. The diffusion grill is arranged between the inlet and outlet and acts as a nozzle means to define an expansion chamber behind the grill and a chamber in front of the grill, on the outside of which combustion occurs. This chamber in front of the grill is called an ignition chamber even through combustion begins in outlet 5, the point at which the deflectors or tapered walls are attached to the adaptation chamber. The diffusion grill has an omega shaped cross-section and is provided with orifices comprising the nozzle means for the flow and the distribution of the gaseous flow over its frontal portion which is either triangular or circular in shape (when seen in a side view) as well as along its lateral walls. These lateral walls are offset from the inner walls of the burner so as to create lateral flow passages for the gaseous flow which passes through the passages. The flow occurs up to the exterior of the chamber in front of the grill via the conical section of the chamber so as to make it possible to ignite the lateral gaseous flow on the exterior of the first and second sections of the adaptation chamber to favor the adhesion of the flame as was discussed above.

The diffusion grill comprises one or two sheets of metal depending upon the pressure of the gas being used. The sheet or sheets are provided with openings comprising a nozzle means. The surface of the openings is at least equal to or greater than the cross-section of the outlet of the ignition chamber forward of the diffusion grill. When using a gas having a low or medium pressure, two sheets of metals are used and may be superimposed and joined or not joined. In order to avoid the return of the flame, the cross-sections of the openings of the upper sheet of metal are greater than the cross-section of the openings of the lower sheet of metal.

As shown in FIGS. 1–5, the burner 1 comprises two half shells symmetrically arranged with respect to one another by means of solder or any other known means. The end 4 is the inlet having a cylindrical shape adapted to fit and to be adjusted onto a nozzle 102 or a feed line of a high flow gas line illustrated in FIG. 6. The end 5 of the burner is the outlet. A diffusion grill 6 is arranged between the inlet 4 and the outlet 5 and comprises a nozzle means. The diffusion grill is maintained so as to define chamber 7 which can be an expansion chamber, and a chamber 8, which is called an ignition chamber, even though the essential part of the combustion occurs only in and beyond outlet 5. The diffusion grill 6 shown in FIG. 3 which may be used for low pressure gas, comprises two perforated sheets of metal 9 and 10 superimposed and offset along their frontal portion. Grill 6 has a vertical cross-section in the shape of an omega whose front portion 11 is circular or rounded. The perforated sheets of metal 9 and 10 are provided with openings comprising the nozzle means along the frontal portion 11 as well as along the lateral walls 12. The total surface area of the openings of the upper sheet of metal 9 is greater than about 50% with respect to the total surface area of the openings of the lower sheets of metal 10 so as to avoid the return or backup of the flame. The total surface area of the openings of the lower sheet of metal 10 is equal to or greater than the surface area of the outlet 5 of chamber 8 of the burner 1. Grill 6 may also be in the form of a single sheet of perforated metal particularly when operating with high pressure gas. However, when operating with medium pressure gases two perforated sheets of metal superimposed and joined may be used.

Grill 6 is maintained in burner 1 by means of extensions or flanges 13 from the lateral walls 12 which are inserted within the grooves 14 provided on shells 2 and 3. The insertion of flanges 13 in grooves 14 determines the position of lateral walls 12 of grill 6 with respect to the interior of the burner 1 so as to form passages 15 for the flow of the gaseous fluid passing across walls 12. The spacing is such that it permits only the flow of the gaseous fluid and not its combustion; combustion occurring only along the exterior of the chamber 8 by virtue of extension 16 of chamber 8 into a conical shape, and the shape and position of the grill as was discussed above with respect to FIG. 6. The combustion of the gaseous fluid flowing across the frontal portion of the grill makes it possible to ignite the lateral gaseous fluid flowing at high speed on the exterior of chamber 8 while favoring adhesion of the flame.

The fact that the combustion of the gaseous fluid occurs at the exterior of the ignition chamber results in a definite advantage, particularly with respect to the walls of the burner 1 which remain cool during the combustion.

The invention is not limited to the particular embodiments disclosed and extends to encompass other embodiments. Thus, expansion chamber 7 and ignition chamber 8 can assume different shapes, e.g., parallelipipedic, cylindrical, oval, etc. The shape of the grill 6 in a cross-section of an omega being adapted to mate with the shapes of the chambers and particularly the shape of the ignition chamber 8.

Figure 1:
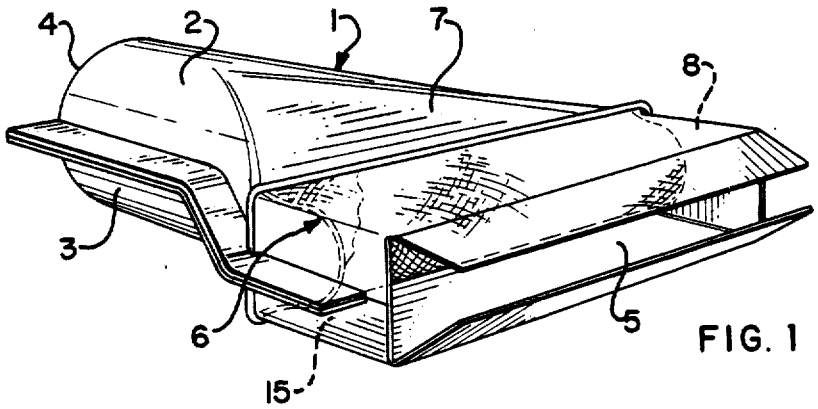
FIG. 1 is a burner having an outlet of rectangular cross-section.
Figure 2:
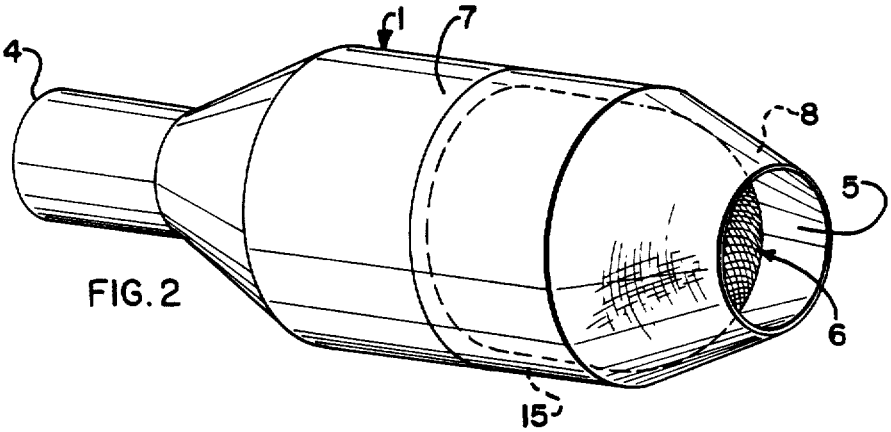
FIG. 2 is a burner having an outlet of circular cross-section.

Whereas FIG. 1 illustrates a parallelipipedic outlet and a diffusion grill in the shape of a rounded omega extending longitudinally along the length of the outlet, FIG. 2 illustrates an embodiment in which the tapering wall of the chamber is conical and the horizontal cross-section of the grill is circular.

Figure 3:
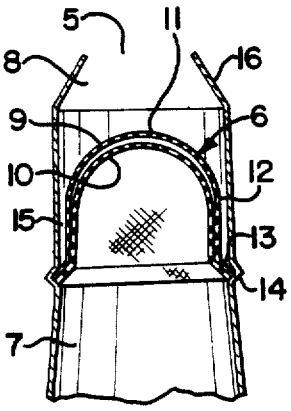
FIGS. 3, 4 and 5 illustrate various shapes of grills arranged in the burners.

FIG. 3 illustrates a double layer grill seen in cross-section wherein the grill has circular or rounded front portion.

Figure 4:
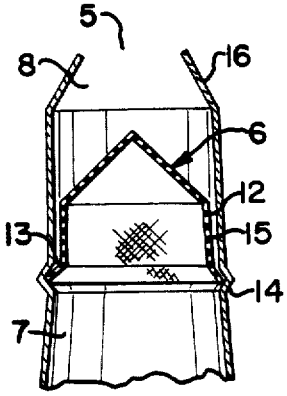
Figure 5:
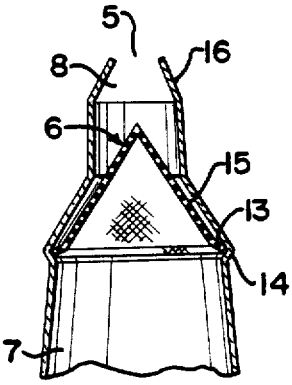

FIG. 4 illustrates a grill having side portions angled with respect to their base while FIG. 5 illustrates a grill having planar side walls or portions extending down to flange 13.

Although the invention has been described with respect to particular means, methods and embodiments, it should be understood that the invention is not limited thereto, and extends to all equivalents within the scope of the claims.

What is claimed is:

1. A gas burner for burning a high velocity gas to produce an external flame having a homogeneous front portion, wherein said gas burner comprises:

gas injecting means having an nozzle connected to a source of inflammable gas under pressure;

a tube through which said inflammable gas is injected, said tube having an inlet portion connected to said nozzle and an outlet portion;

at least an air passage debounching in said tube close to said nozzle, so as to form with said nozzle and said tube a jet pump which creates through said tube a flow of a combination of air and inflammable gas at high speed oriented towards said outlet portion;

an adaptation chamber having first and second sections, said first section comprising a first entrance portion connected to said outlet portion and a first outlet orifice and extending from said entrance portion to said first outlet orifice, a first top wall, a first bottom wall and first and second opposite lateral walls, said first top wall and bottom wall converging inwardly towards each other and increasing in width from said entrance portion to said outlet orifice and said first and second opposite lateral walls diverging from the first entrance portion to the first outlet orifice, said second section comprising a tubular portion having an inlet orifice connected to said first outlet orifice and a second outlet orifice and a second top wall, and a second bottom wall which are substantially parallel to each other and extend respectively from said first top wall and said first bottom wall, and third and fourth substantially parallel lateral walls which extend respectively from said first and said second lateral walls;

two deflectors connected to said second section and extending respectively from said second top wall and said second bottom wall, said first and second deflectors converging towards each other from said second outlet orifice and having two respective parallel front edges, spaced from each other by a first distance;

a curved diffusion grill having a curvature axis which is parallel to said second top and bottom walls and extends perpendicularly to said third and fourth lateral walls, said curved diffusion grill having two substantially parallel longitudinal edges which are respectively connected to said second top wall and to said second bottom wall, two elongated zones respectively formed between said grill and said second top and bottom walls, and two lateral curved edges which are respectively connected to said third and fourth lateral walls, said two longitudinal zones respectively delimiting with said second top and bottom walls two passageways each forming a dead space into which the flame does not spread.

2. A gas burner according to claim 1, wherein said diffusion grill comprises a perforated metal element at least a portion of which is hemi-cylindrically shaped and has a concavity oriented towards the interior of said adaptation chamber.

3. A gas burner according to claim 1, wherein said two deflectors form a substantially 45 degree angle with said respective second top and bottom walls to which said deflectors are respectively attached.

4. A gas burner according to claim 1, wherein said two deflectors are rectangular in shape.

5. A gas burner according to claim 1, wherein said diffusion grill comprises an inner and outer layer of perforated sheet metal, which are superimposed.

6. A gas burner according to claim 1, in which said adaptation chamber is formed out of two half-shells arranged so as to maintain said diffusion grill therebetween.

*7. A gas burner for burning a high flow rate gas, said burner comprising:*

*a feed line of a high flow rate gas;*

*an adaptation chamber having first and second sections, said first section comprising a first entrance portion connected to said feed line and a first outlet orifice, and extending from said entrance portion to said first outlet orifice, a first top wall, a first bottom wall and first and second opposite lateral walls, said first top wall and bottom wall converging inwardly towards each other and increasing in width from said entrance portion to said outlet orifice and said first and second opposite lateral walls diverging from the first entrance portion to the first outlet orifice, said second portion comprising a tubular portion having an inlet orifice connected to said first outlet orifice and a second outlet orifice and a second top wall, and a second bottom wall which are substantially parallel to each other and extend respectively from said first top wall and said first bottom wall, and third and fourth substantially parallel lateral walls which extend respectively from said first and said second lateral walls;*

*two deflectors connected to said second section and extending respectively from said second top wall and said second bottom wall, said first and second deflectors converging towards each other from said second outlet orifice and having two respective parallel front edges, spaced from each other by a first distance;*

*a curved diffusion grill having a curvature axis which is parallel to said second top and bottom walls and extends perpendicularly to said third and fourth lateral walls, said curved diffusion grill having two substantially parallel longitudinal edges which are respectively connected to said second top wall and to said second bottom walls, two elongated zones respectively formed between said grill and said second top and bottom walls, and two lateral curved edges which are respectively connected to said third and fourth lateral walls, said two longitudinal zones respectively delimiting with said second top and bottom walls two passageways each forming a dead space into which the flame does not spread.*

*8. A gas burner according to claim 7, wherein said diffusion grill comprises a perforated metal element at least a portion of which is hemi-cylindrically shaped and has a concavity oriented towards the interior of said adaptation chamber.*

*9. A gas burner according to claim 7, wherein said two deflectors from a substantially 45 degree angle with said respective second top and bottom walls to which said deflectors are respectively attached.*

*10. A gas burner according to claim 7, wherein said two deflectors are rectangular in shape.*

*11. A gas burner according to claim 7, wherein said diffusion grill comprises an inner and outer layer of perforated sheet metal, which are superimposed.*

*12. A gas burner according to claim 7, in which said adaptation chamber is formed out of two half-shells arranged so as to maintain said diffusion grill therebetween.*

* * * * *